US012078333B1

(12) United States Patent
Xu et al.

(10) Patent No.: US 12,078,333 B1
(45) Date of Patent: Sep. 3, 2024

(54) LED LAMP WITH REPLACEMENT TRANSPARENT PLATE BARE-HANDED

(71) Applicant: SHENZHEN SNC OPTO ELECTRONIC CO., LTD, Shenzhen (CN)

(72) Inventors: Jianyong Xu, Shenzhen (CN); Zhigang He, Shenzhen (CN)

(73) Assignee: SHENZHEN SNC OPTO ELECTRONIC CO., LTD, Shenzhen (CN)

( * ) Notice: Subject to any disclaimer, the term of this patent is extended or adjusted under 35 U.S.C. 154(b) by 0 days.

(21) Appl. No.: 18/538,849

(22) Filed: Dec. 13, 2023

(30) Foreign Application Priority Data

Jun. 13, 2023 (CN) ........................ 202310693749.8

(51) Int. Cl.

| | |
|---|---|
| ***F21V 29/83*** | (2015.01) |
| ***F21V 17/10*** | (2006.01) |
| ***F21V 17/12*** | (2006.01) |
| ***F21V 19/00*** | (2006.01) |
| ***F21V 21/08*** | (2006.01) |

(Continued)

(52) U.S. Cl.
CPC ............ *F21V 29/83* (2015.01); *F21V 17/104* (2013.01); *F21V 17/12* (2013.01); *F21V 19/0045* (2013.01); *F21V 19/0055* (2013.01); *F21V 21/0816* (2013.01); *F21V 23/005* (2013.01); *F21V 5/007* (2013.01); *F21V 5/043* (2013.01); *F21V 23/0442* (2013.01); *F21Y 2115/10* (2016.08)

(58) Field of Classification Search
CPC ........ F21V 29/83; F21V 17/104; F21V 17/12; F21V 19/0045; F21V 19/0055; F21V 21/0816; F21V 23/005; F21V 23/0442; F21V 5/043; F21V 5/007
See application file for complete search history.

(56) References Cited

U.S. PATENT DOCUMENTS 9,097,409 B2 * 8/2015 Plomteux ................ F21V 17/00
10,337,718 B2 * 7/2019 Chen ..................... F21V 31/005

(Continued)

FOREIGN PATENT DOCUMENTS

CN 116045260 A * 5/2023

OTHER PUBLICATIONS

Cheng et al, "An Ultra-light Volume Large-power LED", May 2, 2023, Image document CN 116045260A merged with English translation text. (Year: 2023).*

*Primary Examiner* — Alan B Cariaso

(57) ABSTRACT

An LED lamp includes a heat sink, an LED light board installed on a front surface of the heat sink, a transparent plate covering on the LED light board, and a buckle assembly. The buckle assembly includes a base fixed to the heat sink, a first limiting portion, a fastener movably connected to the base, and an elastic member with a first end abutting against the base and a second end abutting against the fastener. When the buckle assembly is in a first state, a first portion of the fastener presses on the transparent plate to fix the transparent plate to the heat sink; when the buckle assembly is in a second state, a second portion of the fastener is pressed against the first limiting portion, and the first end of the fastener is detached from the transparent plate, which can manually remove the transparent plate without needing additional tools.

17 Claims, 10 Drawing Sheets

(51) Int. Cl.

| | |
|---|---|
| ***F21V 23/00*** | (2015.01) |
| ***F21V 23/04*** | (2006.01) |
| ***F21Y 115/10*** | (2016.01) |
| *F21V 5/00* | (2018.01) |
| *F21V 5/04* | (2006.01) |

(56) References Cited

U.S. PATENT DOCUMENTS

| | | | | |
|---|---|---|---|---|
| 11,486,569 | B2 * | 11/2022 | Chen | F21V 23/06 |
| 2013/0039054 | A1 * | 2/2013 | Yang | F21V 29/83<br>362/244 |

* cited by examiner

LED LAMP WITH REPLACEMENT TRANSPARENT PLATE BARE-HANDED

CROSS-REFERENCE TO RELATED APPLICATION

This application claims the benefit of priority from Chinese Patent Application No. 202310693749.8 entitled "LED LAMP" and filed on Jun. 13, 2023, the content of which is hereby incorporated by reference in its entire by reference.

BACKGROUND

Technical Field

The present disclosure generally relates to the field of lighting devices, and especially relates to an LED lamp that can replace a transparent plate bare-handed.

Description of Related Art

An LED lamp with a plurality of advantages such as energy conservation, environmental protection and a long life span, has been widely used in various lighting places. A conventional LED lamp generally includes a lens plate covered on an LED light board of the LED lamp along an illumination direction of the LED light board and fixed to a heat sink of the LED lamp by screws. When the lens plate needs to be replaced according to requirements of various usage places, or when the LED light board needs to be repaired, it needs to use a screwdriver to remove the lens plate, which is inconvenient to operate and inefficient. Therefore, it is necessary to design a new LED lamp to solve the above problem.

SUMMARY

The technical problems to be solved: in view of the shortcomings of the related art, the present disclosure provides an LED lamp which can replace a transparent plate bare-handed.

In a first aspect, an LED lamp with a replacement transparent plate bare-handed according to an embodiment of the present disclosure includes: a heat sink, an LED light board installed on a front surface of the heat sink, the transparent plate covering on the LED light board; the LED lamp further including a buckle assembly that includes a base fixed to the heat sink, a first limiting portion, a fastener movably connected to the base, and an elastic member with a first end abutting against the base and a second end abutting against the fastener;

when the buckle assembly is in a first state, a first portion of the fastener presses on the transparent plate to fix the transparent plate to the heat sink; and when the buckle assembly is in a second state, a second portion of the fastener is pressed against the first limiting portion, and the first portion of the fastener is detached from the transparent plate.

In a second aspect, an LED lamp according to an embodiment of the present disclosure includes: a heat sink, an LED light board, a transparent plate and a buckle assembly; the LED light board installed on a front surface of the heat sink, the transparent plate covering on the LED light board, and the buckle assembly movably installed on the heat sink and configured to buckle or release the transparent plate for easy installation and removal of the transparent plate; and wherein when the buckle assembly is in a first state, the buckle assembly buckles the transparent plate and fixes the transparent plate to the heat sink;

when the buckle assembly is in a second state, the buckle assembly releases the transparent plate so that the transparent plate is detached from the heat sink; and the buckle assembly includes a base fixed to a back surface of the heat sink, and a fastener movably connected to the base and configured to fasten or release the transparent plate;

and wherein the base and the heat sink are integrated with each other; and wherein the fastener includes a board portion arranged on the back surface of the heat sink and movably connected to the base, a connecting portion connected to the board portion and extending from the board portion to the transparent plate, and a compressing portion connected to the connecting portion, arranged on a side of the transparent plate away from the board portion and configured to buckle the transparent plate; when the buckle assembly is in the first state, the compressing portion of the fastener presses on the transparent plate to fix the transparent plate to the heat sink.

The present disclosure provides the advantages as below: the present disclosure is provided that when it is necessary to replace the transparent plate, the fastener is first compressed and moves, and when the second limiting portion of the fastener moves to the first limiting portion, the fastener is then deflected to a certain angle to temporarily limit the fastener by the first limiting portion, at the same time, the fastener is detached from the transparent plate to uncompress the transparent plate, at this time, the transparent plate can be manually removed. After replacing the transparent plate, the fastener is deflected to the certain angle so that the fastener is detached from the first limiting portion and resets to re-press on the transparent plate under an action of the elastic member. Furthermore, the present disclosure can manually remove the transparent plate for replacing or maintaining the transparent plate without needing additional tools, and have a simple and convenient operation.

BRIEF DESCRIPTION OF THE DRAWINGS

In order to more clearly understand the technical solution hereinafter in embodiments of the present disclosure, a brief description to the drawings used in detailed description of embodiments hereinafter is provided thereof. Obviously, the drawings described below are some embodiments of the present disclosure, for one of ordinary skill in the related art, other drawings can be obtained according to the drawings below on the premise of no creative work.

The element labels according to the embodiment of the present disclosure shown as below:

heat sink, 11 front surface, 12 back surface, 13 opening, 14 annular groove, 20 LED light board, 30transparent plate, 31 second groove, 32 receiving room, 321 buckle, 33 annular convex ring, 40 buckle assembly, 41 base, 411 first groove, 4111 bottom wall, 4112 sidewall, 412 supporting rod, 414 first limiting portion, 4141 upper end, 42 fastener, 421 board portion, 4211 track hole, 4212 top end, 422 connecting portion, 423 compressing portion, 424 third limiting portion, 425 second limiting portion, 4251 lower end, 426 limiting groove, 427 protrusion, 428 first portion, 429 second portion, 43 elastic member, 431 first end, 432 second end, 50 screw, 51 nut, 511 bottom end, 52 screw hole, 60 sensor, 70 waterproof ring, 80 box, 81 power supply, 90 hook.

DETAILED DESCRIPTION

Reference will now be made in detail to embodiments, examples of which are illustrated in the accompanying drawings. In the following detailed description, numerous specific details are set forth in order to provide a thorough understanding of the subject matter presented herein. Obviously, the implementation embodiment in the description is a part of the present disclosure implementation examples, rather than the implementation of all embodiments, examples. According to the described exemplary embodiment of the present disclosure, all other embodiments obtained by one of ordinary skill in the related art on the premise of no creative work are within the protection scope of the present disclosure.

It should also be understood that the terms used in the specification of the present disclosure are only for the purpose of describing specific embodiments without being intended to limit the present disclosure. As used in the description of the present disclosure and the appended claims, terms of “one”, “one” and “the” in a singular form are intended to include a plural form unless the context clearly indicates otherwise.

It should also be further understood that the term “and/or” used in the description of the present disclosure and the appended claims refers to any combination of one or more of associated listed items and all possible combinations, and includes these combinations.

Figure 1:
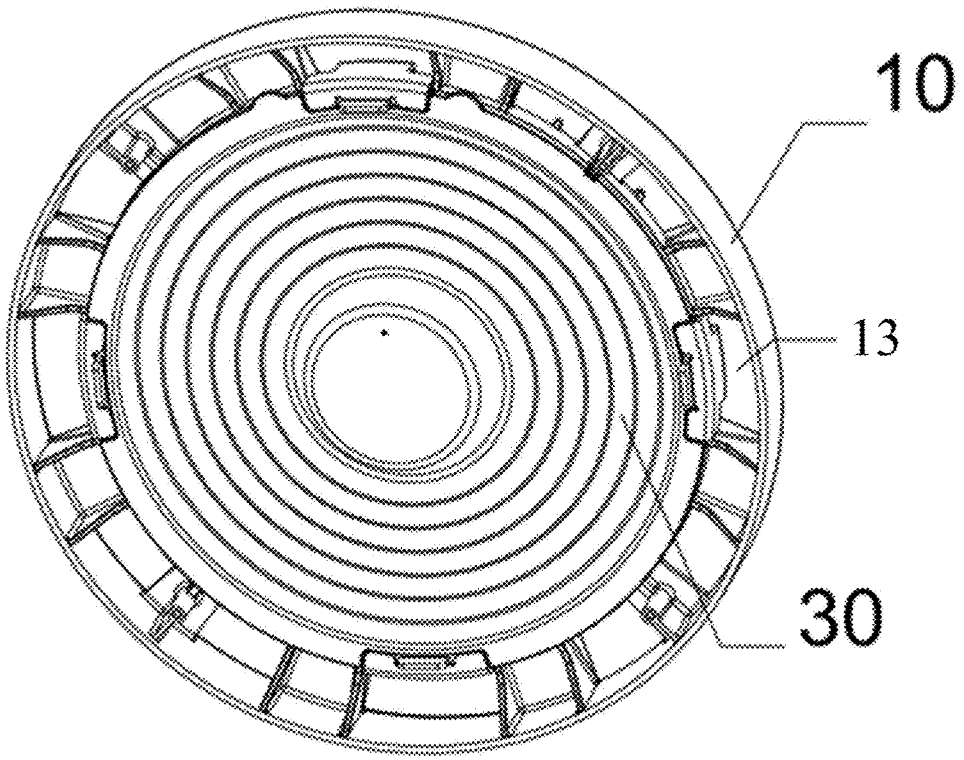
FIG. 1 is a schematic view of an LED lamp with a replacement transparent plate bare-handed in accordance with an embodiment of the present disclosure.
Figure 2:
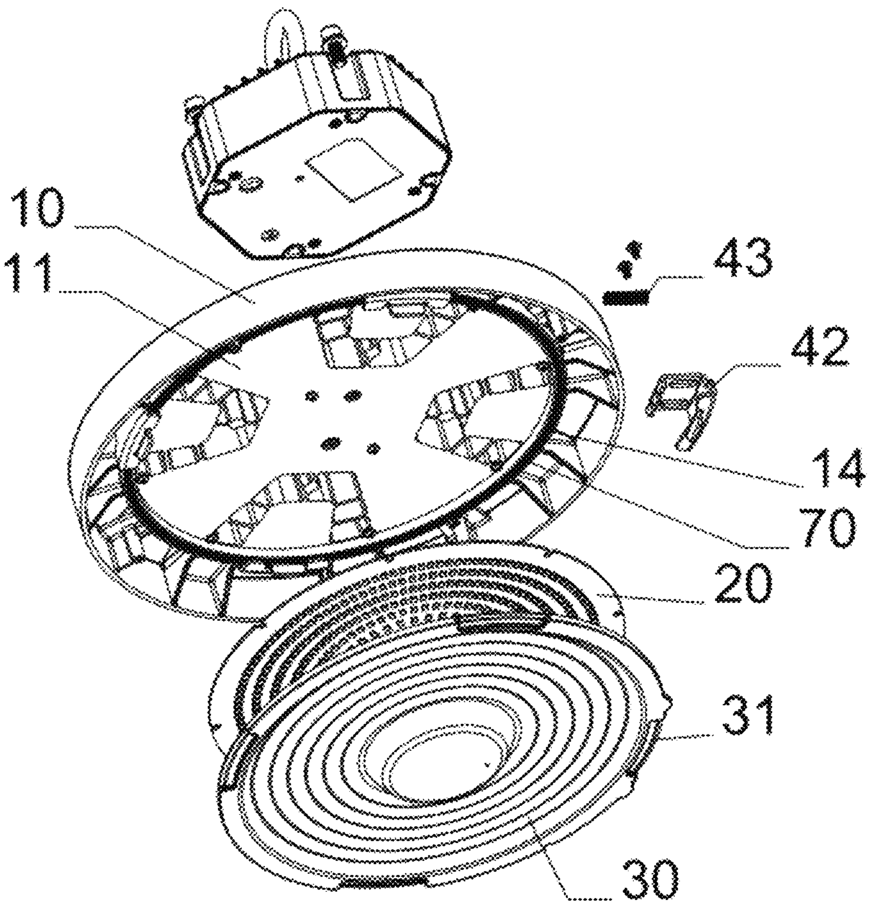
FIG. 2 is an exploded, schematic view of the LED lamp of FIG. 1.
Figure 3:
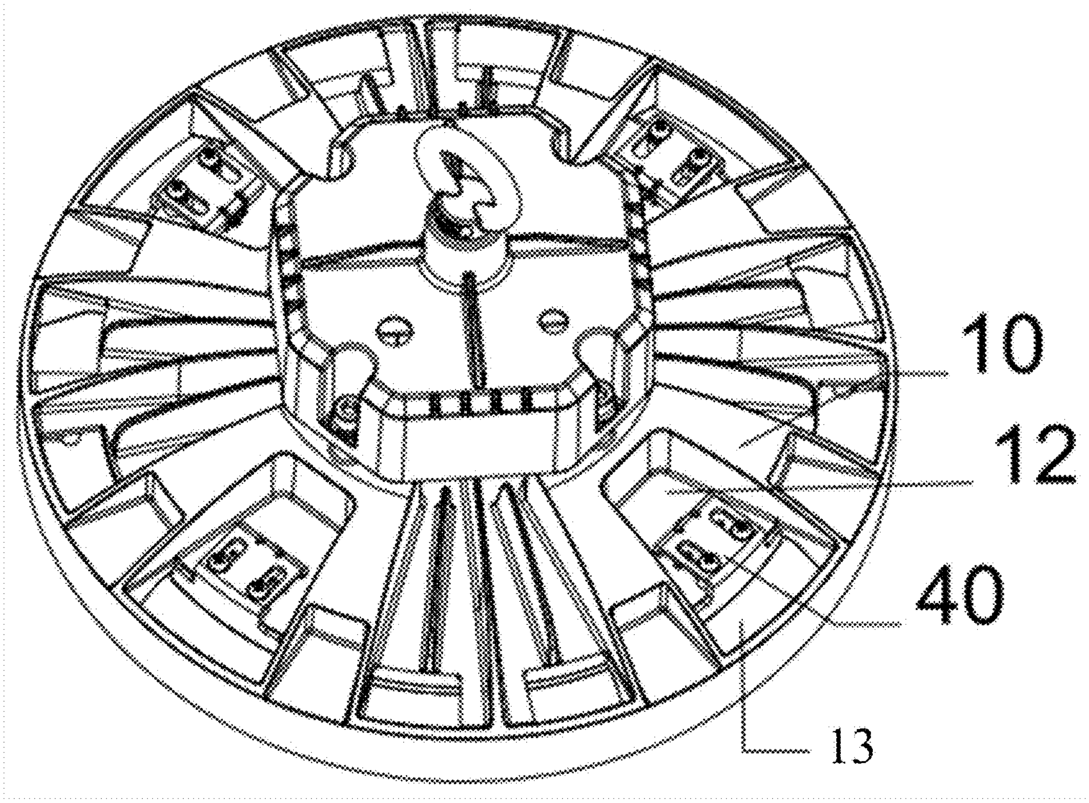
FIG. 3 is similar to FIG. 1, but shown from another view.
Figure 4:
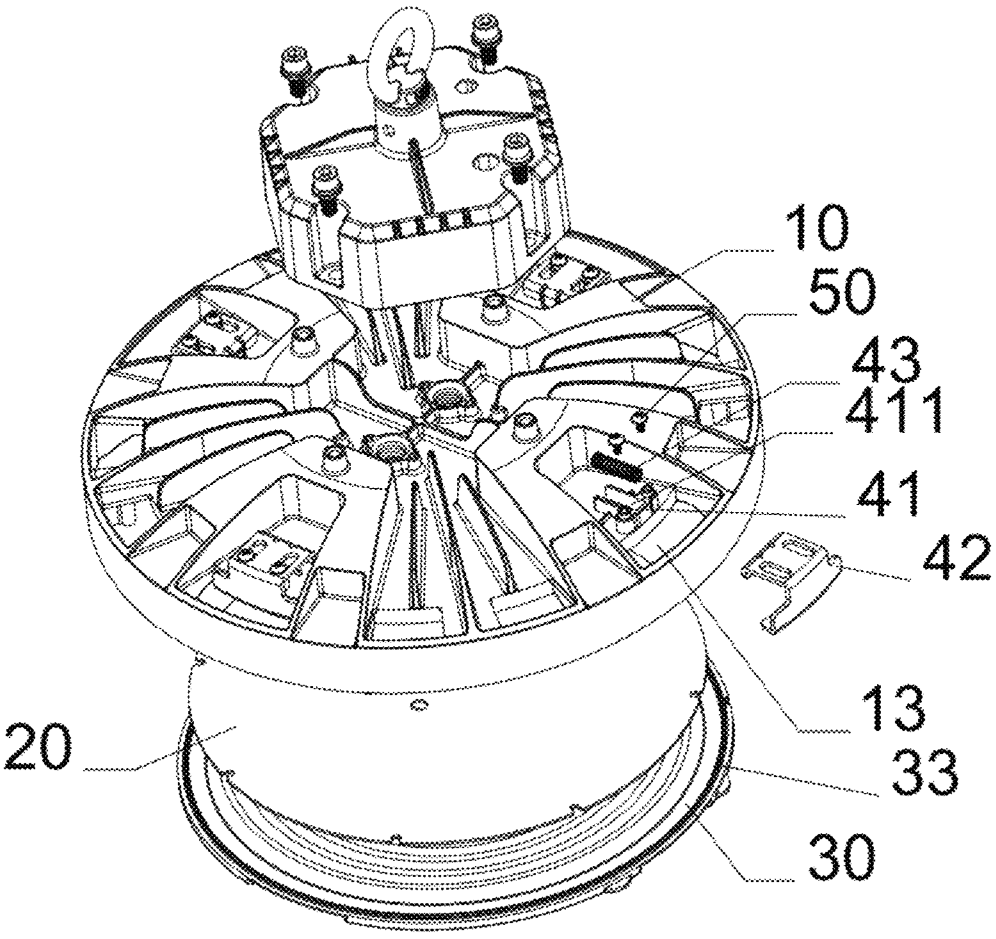
FIG. 4 is similar to FIG. 2, but shown from another view.
Figure 5:
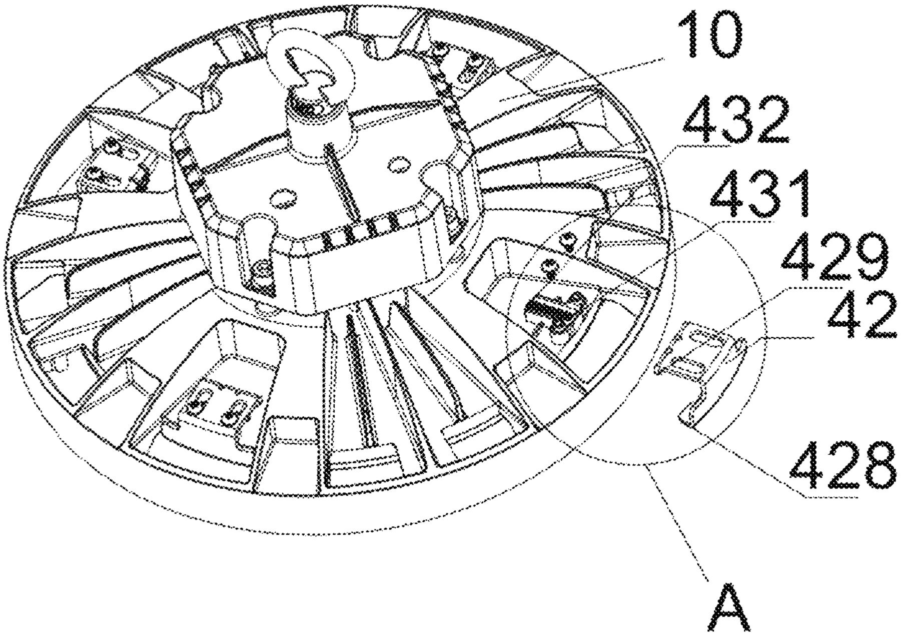
FIG. 5 is similar to FIG. 4, but shown from another view.
Figure 6:
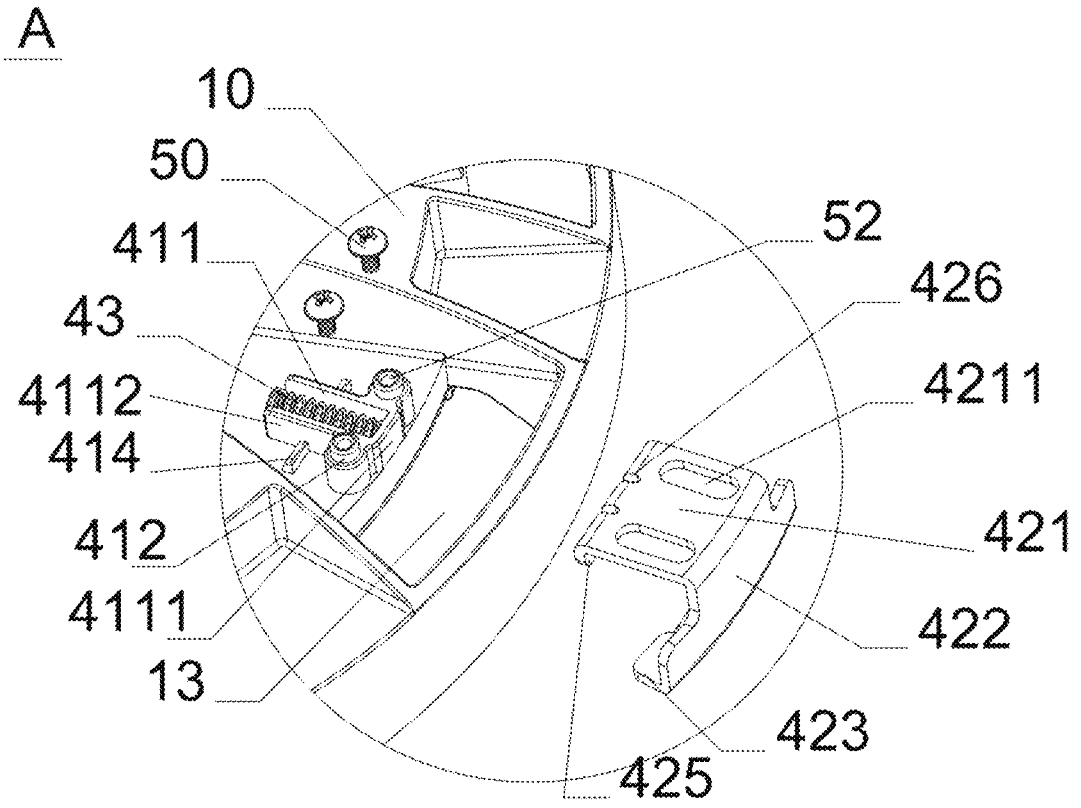
FIG. 6 is an enlarged view of a circle A of FIG. 5.
Figure 7:
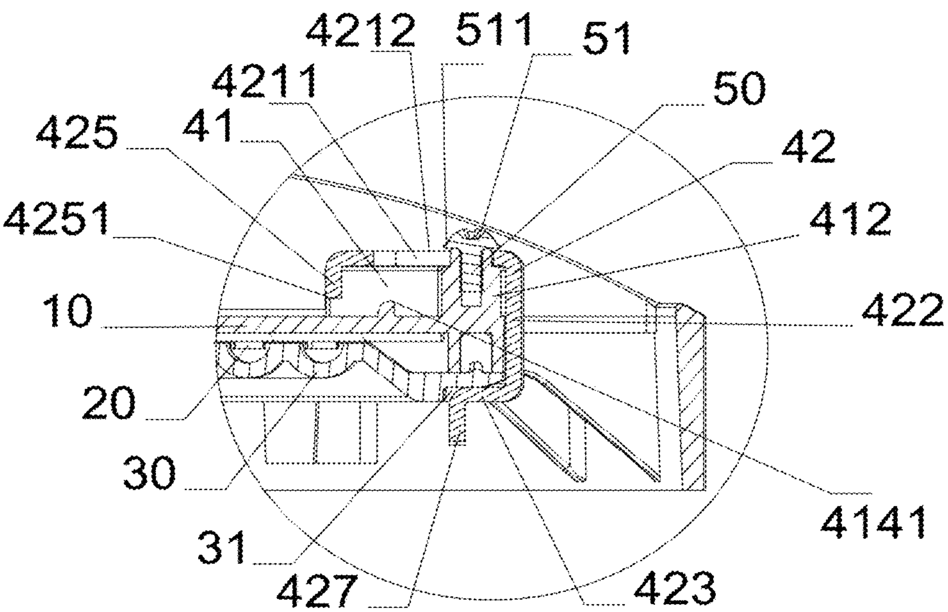
FIG. 7 is a cross sectional view of a buckle assembly of the LED lamp of FIG. 1, shown the buckle assembly in a first state.
Figure 8:
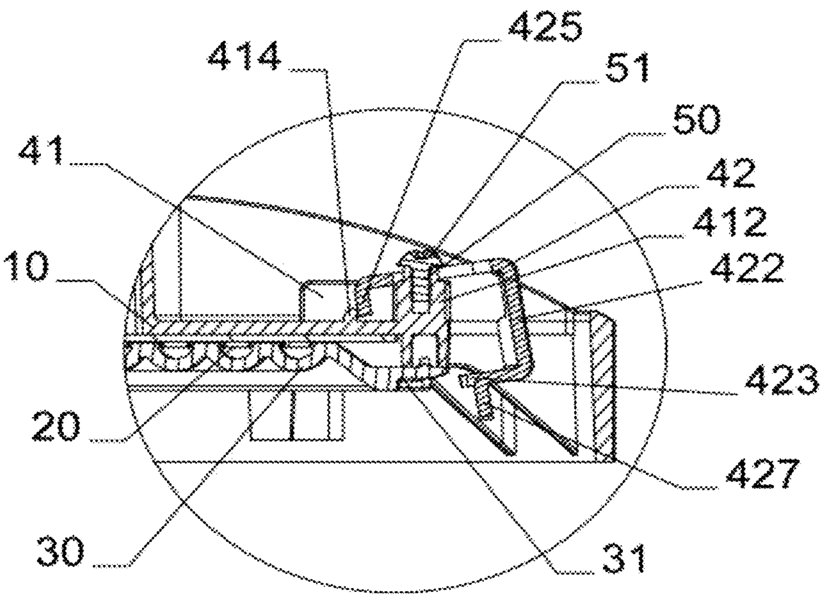
FIG. 8 is similar to FIG. 7, but shown the buckle assembly in a second state.
Figure 9:
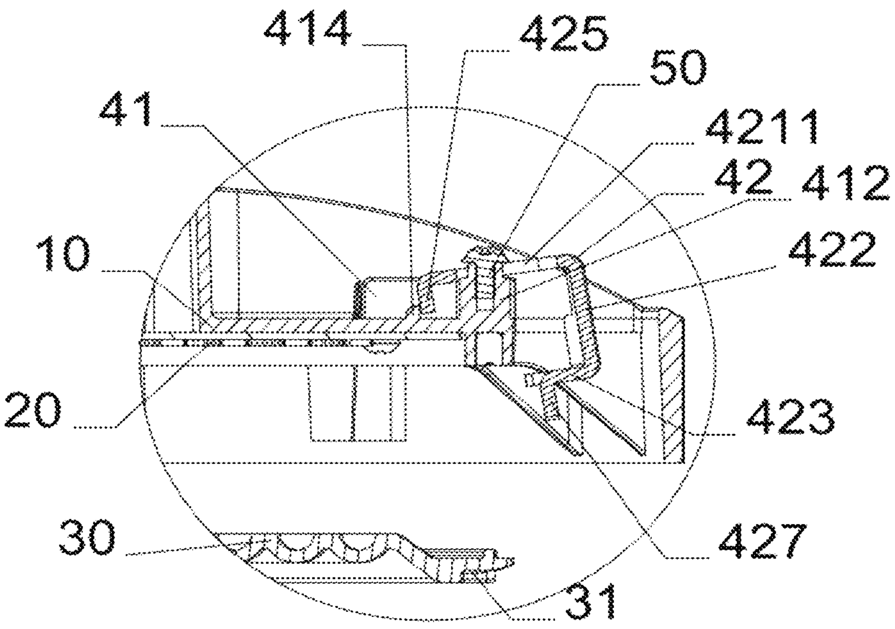
FIG. 9 is similar to FIG. 8, but shown from another view.
Figure 10:
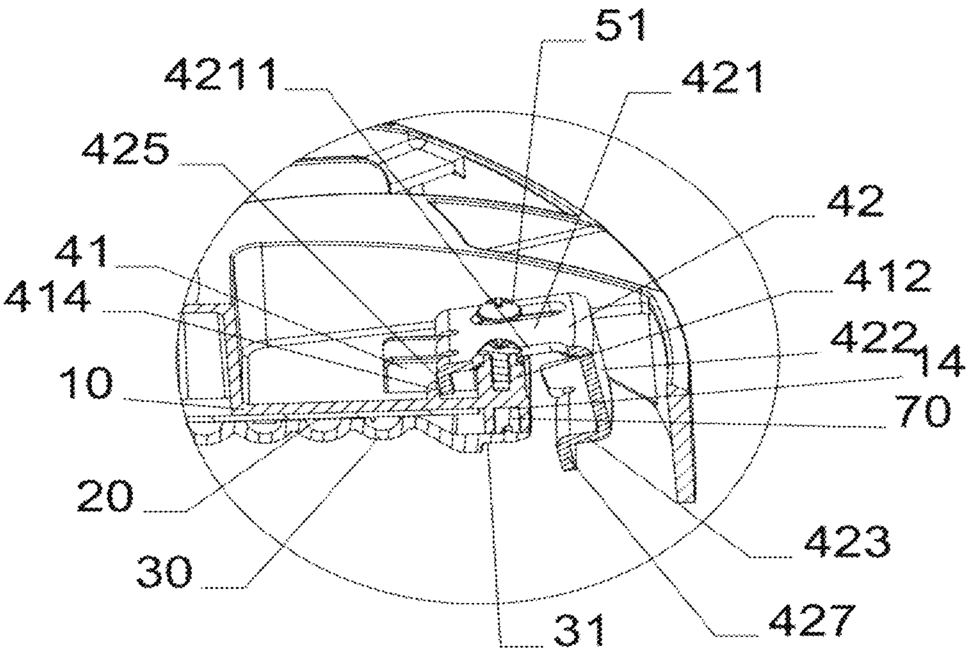
FIG. 10 is similar to FIG. 8, but shown from another view.
Figure 11:
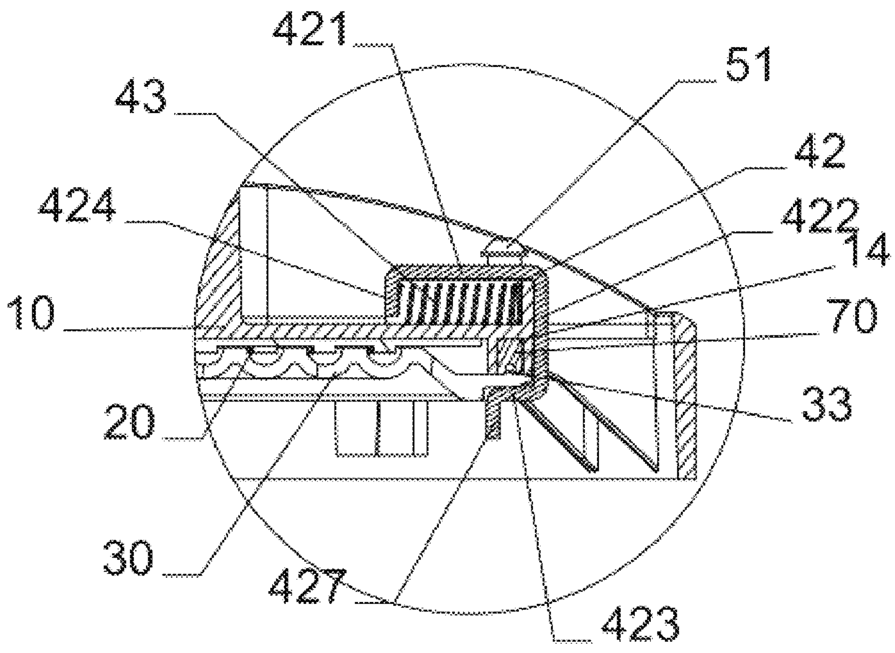
FIG. 11 is similar to FIG. 7, but shown from another view.
Figure 12:
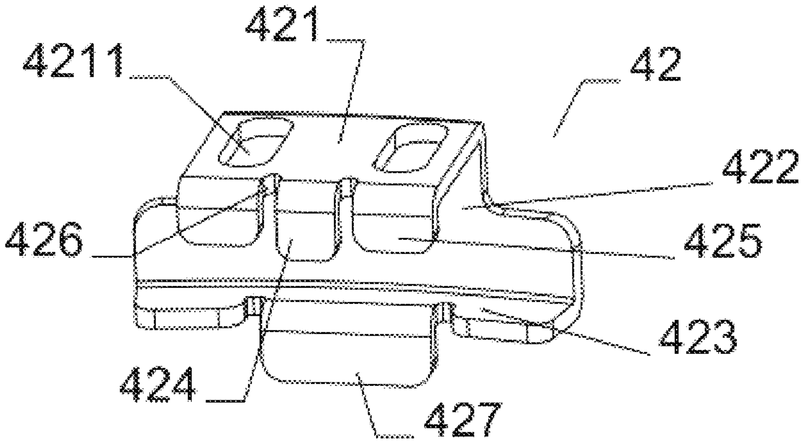
FIG. 12 is a schematic view of a fastener of the LED lamp of FIG. 1.
Figure 13:
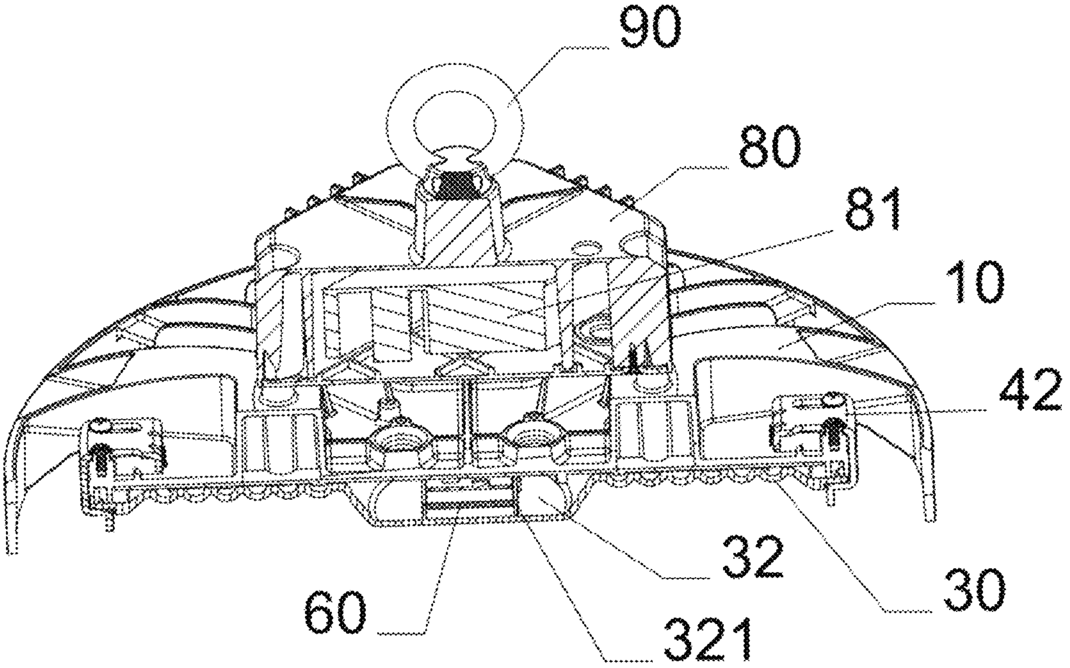
FIG. 13 is a cross sectional view of the LED lamp of FIG. 1.

Referring to FIGS. 1-13, an LED lamp with a replacement transparent plate bare-handed in accordance with an embodiment of the present disclosure includes a heat sink 10, an LED light board 20 and a transparent plate 30. The LED light board 20 is composed of a plurality of LED beads that is fixed to a circuit board, the LED light board 20 is installed on a front surface 11 of the heat sink 10, and the transparent board 30 is a lens plate and covers on the LED light board 20.

The LED lamp also includes a buckle assembly 40 that includes a base 41, a first limiting portion 414, an elastic member 43 and a fastener 42. The base 41 is fixed to the heat sink 10, and the fastener 42 is movably connected to the base 41. A first end 431 of the elastic member 43 abuts against the base 41 and a second end 432 of the elastic member 43 abuts against the fastener 42. When the buckle assembly 40 is in a first state, a first portion 428 of the fastener 42 presses on the transparent plate 30 to fix the transparent plate 30 to the heat sink 10; and when the buckle assembly 40 is in a second state, a second portion 429 of the fastener 42 is pressed against the first limiting portion 414, and the first portion 428 of the fastener 42 is detached from the transparent plate 30.

By setting the buckle assembly 40, when it is necessary to remove the transparent plate 30, it is only to manually squeeze the fastener 42 horizontally, and when the second portion 429 of the fastener 42 moves to cross a first limiting portion 414, and then the fastener 42 slightly rotates to make the second portion 429 of the fastener 42 abut against the first limiting portion 414, thereby preventing the fastener 42 from being reset. At the same time, the first portion 428 of the fastener 42 is cocked up and detached from the transparent plate 30, at this point, the transparent plate 30 can be manually removed without needing additional tools.

The base41 is arranged on a back surface 12 of the heat sink 10, and the fastener 42 includes a board portion 421 arranged on the back surface 12 of the heat sink 10 and movably connected to the base 41, a connecting portion 422 connected to the board portion 421, and a compressing portion 423 arranged on the front surface 11 of the heat sink 10 and connected to the connecting portion 422; when the buckle assembly40 is in the first state, the compressing portion 423 of the fastener40 presses on the transparent plate 30 to fix the transparent plate 30 to the heat sink 10.

The fastener 42 further includes a second limiting portion 425 connected to the board portion 421, and when the buckle assembly 40 is in the second state, the second limiting portion 425 abuts against the first limiting portion 414, which can prevent the fastener 42 from being reset, so that the transparent plate 30 can be manually removed. The fastener 42 is a sheet-metal part, and the second limiting portion 425 is a bending plate formed on an edge of the board portion 421.

The buckle assembly 40 further includes a supporting rod 412 with a screw hole 52 being formed on a top of the supporting rod 412, a screw 50 connected inside the screw hole 52, the board portion421 of the fastener 42 including a track hole 4211, and the screw 50 passing through the track hole 4211 to connect to the supporting rod 412. In this way, the fastener 42 can be freely moved along a length direction of the track hole 4211.

The screw 50 includes a nut 51 that a bottom end 511 of the nut 51 is spaced apart from a top end 4212 of the board portion 421. The nut 51 is provided to limit the fastener 42 to the supporting rod 412, and a spacing setting between the nut 51 and the board portion 421 is designed that the board portion 421 of the fastener 42 can freely move between the nut 51 and the top of the supporting rod 412. During a compression process of the buckle assembly 40, when the second limiting portion 425 of the board portion 421 moves to cross the first limiting portion 414, the fastener 42 can deflect to a certain angle between the nut 51 and the top of the supporting rod 412, so that the second limiting portion 425 of the fastener 42 abuts against the first limiting portion 414 to prevent the fastener 42 from being reset, so as to further manually remove the transparent plate 30.

The first limiting portion 414 is arranged on both sides of the base 41; and when the buckle assembly 40 is in the first state, a lower end of the second limiting portion 425 is vertically spaced apart from an upper end of the first limiting portion 414. Such interval setting is designed that the second limiting portion 425 can cross the first limiting portion 414 when the elastic member 43 is compressed (that is, when the fastener 42 moves towards an outer side of the heat sink 10), and then the fastener 42 is deflected to the certain angle, so that the second limiting portion 425 of the fastener 42 abuts against a side of the first limiting portion 414.

The base41 includes a first groove 411 with a U-shaped structure. The first groove 411 includes a bottom wall 4111, and two sidewalls 4112 opposite to each other and respectively connected to the bottom wall 4111. The elastic member 43 is arranged inside the first groove 411. The fastener 42 further includes a third limiting portion 424 with a width smaller than a width of the first groove 411, so that the third limiting portion 424 can move within the first groove 411 during the movement of the fastener 42.

The elastic member 43 is received in the first groove 411, and a first end 431 of the elastic member 43 abuts against the base 41, and a second end 432 of the elastic member 43 abuts against the third limiting portion 424.

Both the second limiting portion 425 and the third limiting portion424 are arranged on the same side of the board portion 421 of the fastener 42, and a limiting groove 426 is formed between the second limiting portion 425 and the third limiting portion 424. When the buckle assembly 40 is in the second state, the sidewall 4112 of the first groove 411 is received in the limiting groove 426. The limiting groove 426 is provided as a guide pole to obtain a smoother compression process thereof.

The heat sink 10 includes at least two openings 13 formed at edges of the heat sink 10 and passing through the heat sink 10, and an outer edge of the transparent plate 30 is adjacent to an edge of each of the at least two openings 13. The connecting portion422 of the fastener 42 is arranged inside the at least two openings 13, and a second groove 31 is arranged at a position where the transparent plate 30 aligns with the at least two openings 13. When the buckle assembly 40 is in the first state, the compressing portion423 of the fastener42 is pressed into the second groove 31; and when the buckle assembly40 is in the second state, the compressing portion423 of the fastener42 is detached from the second groove 31.

The compressing portion 423 includes a protrusion 427 extending towards a direction away from the board portion 421 and being convenient for manually move the fastener 42. The heat sink 10 includes an annular groove 14 formed corresponding to edges of the transparent plate 30, an annular waterproof ring 70 arranged inside the annular groove 14. The transparent plate 30 includes an annular convex ring 33 formed at an edge of the transparent plate 30 and corresponding to the annular groove 14. When the buckle assembly40 is in the first state, the annular convex ring 33 presses against the waterproof ring 70, and projections of all the waterproof ring 70, the annular convex ring 33, the second groove 31 and the compressing portion 423 are partially overlapped along a vertical direction thereof, which can obtain a good waterproof effect thereof.

The transparent plate 30 is a lens plate and there is a lens structure formed on the transparent plate 30.

The elastic member 43 is a spring.

The transparent plate 30 includes a receiving room 32 formed at a middle of the transparent plate 30 and a buckle 321 is arranged in the receiving room 32. A sensor 60 is installed on the buckle 321 or the LED light board 20, which can be a microwave sensor. A box 80 is connected to the back surface 12 of the heat sink 10 and a power supply 81 is received in the box 80. The box 80 is connected to a hook 90. The sensor 60 is configured to sense whether a human body has passed by the LED lamp. If a human body has passed by the LED lamp, the LED lamp is controlled to be turned on. Other sensors can be ambient light sensors that control the LED lamp to be turned on or turned off based on a brightness of an environment. For example, when the day turns dark, the LED lamp is controlled to be turned on through the ambient light sensor.

When it is necessary to replace the transparent plate 30, the fastener 42 is first compressed and moves, and when the second limiting portion 425 of the fastener 42 moves to the first limiting portion 414, the fastener 42 is then deflected to a certain angle to temporarily limit the fastener 42 by the first limiting portion 414, at the same time, the fastener 42 is detached from the transparent plate 30 to uncompress the transparent plate 30, at this time, the transparent plate 30 can be manually removed. After replacing the transparent plate 30, the fastener 42 is deflected to the certain angle to release the fastener 42 from the first limiting portion 414 and reset to re-press on the transparent plate 30 under an action of the elastic member 43.

The above embodiment of present disclosure provides the advantages as below: the present disclosure can manually remove the transparent plate 30 for replacing or maintaining the transparent plate 30 without needing additional tools, and have a simple and convenient operation.

The LED lamp in accordance with another embodiment of the present disclosure includes a heat sink 10, an LED light board 20, a transparent plate 30 and a buckle assembly 40. The LED light board 20 is installed on a front surface 11 of the heat sink 10, the transparent plate 30 covering on the LED light board 20, and the buckle assembly 40 movably installed on the heat sink 10. When the buckle assembly 40 is in a first state, the buckle assembly 40 buckles the transparent plate 30 to fix the transparent plate 30 to the heat sink 10; and when the buckle assembly 40 is in a second state, the buckle assembly 40 releases the transparent plate 30 so that the transparent plate 30 can be manually replaced.

In an embodiment of the present disclosure, the buckle assembly 40 includes a base 41 fixed to a back surface 12 of the heat sink 10 and configured to movably install the buckle assembly 40 on the heat sink 10, and a fastener 42 movably connected to the base 41 and configured to buckle or release the transparent plate 30. The base 41 and the heat sink 10 are integrated with each other, which can reduce the number of elements and the labor force required for assembling the LED lamp, and thereby lowering labor costs. When it is necessary to replace the transparent plate 30, the fastener 42 is in a position of releasing the transparent plate 30, at this time, the old transparent plate 30 can be removed to replace the old transparent plate 30 with a new transparent plate 30. Subsequently, the fastener 42 is adjusted to a position where the transparent plate 30 is buckled, and at this time, the fastener 42 positions the transparent plate 30. During the above process of adjusting the fastener 42, a manual operation is sufficient without needing additional tools.

The fastener 42 includes a board portion 421 arranged on the back surface 12 of the heat sink 10 and movably connected to the base 41, a connecting portion 422 connected to the board portion 421 and extending from a side of the board portion 421 to a side of the transparent plate 30, and a compressing portion 423 connected to the connecting portion 422, arranged on a side of the transparent plate 30 away from the board portion 421 and configured to buckle the transparent plate 30. When the buckle assembly40 is in the first state, the compressing portion 423 of the fastener42 presses on the transparent plate 30 to fix the transparent plate 30 to the heat sink 10.

The base41 includes a first groove411 and at least one supporting rod 412 connected to the first groove 411, the board portion 421 arranged on the first groove411 and the at least one supporting rod 412. The board portion 421 includes at least one track hole 4211, a screw 50 passing through the at least one track hole4211 and the at least one supporting rod 412 so that the board portion 421 is movably arranged on the first groove411 and the at least one supporting rod 412.

The first groove 411 is a U-shaped structure and includes a bottom wall 4111, and two sidewalls 4112 opposite to each other and respectively connected to the bottom wall 4111. The bottom wall 4111 is arranged on a side of the sidewall 4112 near an edge of the heat sink 10. The buckle assembly 40 further includes an elastic member 43 arranged inside the first groove 411, and the fastener 42 further includes a third limiting portion 424 connected to an end of the board portion 421 away from the connecting portion 422, and extending into an end of the first groove 411 away from the connecting portion 422, the first end 431 of the elastic member 43 abutted against the base 41, and the second end 432 of the elastic member 43 abutted against the third limiting portion 424.

The base 41 further includes at least one first limiting portion 414 arranged on an outer side of the first groove 411, and the fastener 42 includes a second limiting portion 425 corresponding to the first limiting portion 424 and connected to the end of the board portion 421 away from the connecting portion 422. When the buckle assembly 40 is in the first state, the compressing portion 423 of the fastener 42 presses on the transparent plate 30 to fix the transparent plate 30 to the heat sink 10; and when the buckle assembly 40 is in the second state, the second limiting portion 425 of the fastener 42 abuts against the first limiting portion 414, and the compressing portion 423 of the fastener 42 releases the transparent plate 30. When it is necessary to replace the transparent plate 30, the fastener 42 is pushed, at this time, the elastic member 43 is compressed, the second limiting portion 425 moves to cross the at least one first limiting portion 414, and the fastener 42 is deflected to a certain angle, so that the second limiting portion 425 of the fastener 42 is pressed against the at least one first limiting portion 414 to prevent the fastener 42 from being reset under an action of the elastic member 43, and then the transparent plate 30 can be manually removed for convenient operation of the LED lamp.

The fastener 42 further includes a pair of limiting grooves 426 arranged between the second limiting portion 425 and the third limiting portion 424, when the third limiting portion 424 slides within the first groove 411, the sidewall 4112 of the first groove 411 is received in the limiting groove 426, so that the limiting groove 426 is provided as a guide pole to prevent the fastener 42 from deviating directions during movement of the fastener 42.

The heat sink 10 includes at least two openings 13 formed at edges of the heat sink 10 and passing through the heat sink 10, and an outer edge of the transparent plate 30 is adjacent to an edge of each of the at least two openings 13. The connecting portion422 of the fastener 42 is arranged inside the at least two openings 13, and a second groove 3 is arranged at a position where the transparent plate 30 aligns with the at least two openings 13. When the buckle assembly40 is in the first state, the compressing portion423 of the fastener42 is pressed into the second groove 31; and when the buckle assembly40 is in the second state, the compressing portion423 of the fastener42 is detached from the second groove 31.

The transparent plate 30 includes a receiving room 32 formed at a middle of the transparent plate 30 and a buckle 321 is arranged in the receiving room 32. A sensor 60 is installed on the buckle 321 or the LED light board 20, which can be a microwave sensor. The sensor 60 is configured to sense whether a human body has passed by the LED lamp. If a human body has passed by the LED lamp, the LED lamp is controlled to be turned on.

The above embodiment of present disclosure provides the advantages as below: the present disclosure can manually remove the transparent plate 30 for replacing or maintaining the transparent plate 30 without needing additional tools, and have a simple and convenient operation.

Although the features and elements of the present disclosure are described as embodiments in particular combinations, each feature or element can be used alone or in other various combinations within the principles of the present disclosure to the full extent indicated by the broad general meaning of the terms in which the appended claims are expressed. Any variation or replacement made by one of ordinary skill in the related art without departing from the spirit of the present disclosure shall fall within the protection scope of the present disclosure.

What is claimed is:

1. An LED lamp comprising a heat sink with a front surface thereof, an LED light board installed on the front surface of the heat sink, a transparent plate covering on the LED light board; wherein the LED lamp further comprises a buckle assembly comprising a base fixed to the heat sink, a first limiting portion, a fastener movably connected to the base, and an elastic member with a first end abutting against the base and a second end abutting against the fastener; and wherein when the buckle assembly is in a first state, a first portion of the fastener presses on the transparent plate to fix the transparent plate to the heat sink; and when the buckle assembly is in a second state, a second portion of the fastener is pressed against the first limiting portion, and the first portion of the fastener is detached from the transparent plate.

2. The LED lamp as claimed in claim 1, wherein the base is arranged on a back surface of the heat sink, and the fastener comprises a board portion arranged on the back surface of the heat sink and movably connected to the base, a connecting portion connected to the board portion, and a compressing portion arranged on the front surface of the heat sink and connected to the connecting portion; when the buckle assembly is in the first state, the compressing portion of the fastener presses on the transparent plate to fix the transparent plate to the heat sink.

3. The LED lamp as claimed in claim 2, wherein the fastener further comprises a second limiting portion connected to the board portion, and when the buckle assembly is in the second state, the second limiting portion abuts against the first limiting portion.

4. The LED lamp as claimed in claim 3, wherein the buckle assembly further comprises a supporting rod with a screw hole being formed on a top of the supporting rod, a screw connected inside the screw hole, the board portion of the fastener comprising a track hole, and the screw passing through the track hole to connect to the supporting rod.

5. The LED lamp as claimed in claim 4, wherein the screw comprises a nut, and a bottom end of the nut spaced apart from a top end of the board portion.

6. The LED lamp as claimed in claim 5, wherein the first limiting portion is arranged on both sides of the base; and when the buckle assembly is in the first state, a lower end of the second limiting portion is vertically spaced apart from an upper end of the first limiting portion.

7. The LED lamp as claimed in claim 3, wherein the base defines a first groove with a U-shaped structure for receiving the elastic member therein; the fastener further comprising a third limiting portion, a width of the third limiting portion smaller than a width of the first groove, the first end of the elastic member abutted against the base, and the second end of the elastic member abutted against the third limiting portion.

8. The LED lamp as claimed in claim 7, wherein both the second limiting portion and the third limiting portion are arranged on the same side of the board portion of the fastener, a limiting groove is formed between the second limiting portion and the third limiting portion; the first groove comprising a bottom wall and two sidewalls respectively connected to the bottom wall, when the buckle assembly is in the second state, the two sidewalls of the first groove received in the limiting groove.

9. The LED lamp as claimed in claim 7, wherein the heat sink comprises at least two openings formed at edges of the heat sink and passing through the heat sink, and an outer edge of the transparent plate is adjacent to an edge of each of the at least two openings; the connecting portion of the fastener arranged inside the at least two openings, and a second groove arranged at a position where the transparent plate aligns with the at least two openings; wherein when the buckle assembly is in the first state, the compressing portion of the fastener is pressed into the second groove; and when the buckle assembly is in the second state, the compressing portion of the fastener is detached from the second groove.

10. The LED lamp as claimed in claim 7, wherein the compressing portion comprises a protrusion extending towards a direction away from the board portion; the heat sink comprising an annular groove corresponding to edges of the transparent plate, an annular waterproof ring arranged inside the annular groove; the transparent plate comprising an annular convex ring formed at an edge of the transparent plate and corresponding to the annular groove; when the buckle assembly is in the first state, the annular convex ring presses against the waterproof ring, and projections of all the waterproof ring, the annular convex ring, the second groove and the compressing portion are partially overlapped along a vertical direction thereof.

11. An LED lamp comprising:

a heat sink with a front surface thereof;

an LED light board installed on the front surface of the heat sink;

a transparent plate covering on the LED light board; and a buckle assembly installed on the heat sink and configured to buckle or release the transparent plate for easy installation and removal of the transparent plate; and wherein when the buckle assembly is in a first state, the buckle assembly buckles the transparent plate and fixes the transparent plate to the heat sink; and when the buckle assembly is in a second state, the buckle assembly releases the transparent plate so that the transparent plate is detached from the heat sink; and the buckle assembly comprises a base fixed to a back surface of the heat sink, and a fastener movably connected to the base and configured to buckle or release the transparent plate; and wherein the base and the heat sink are integrated with each other; and wherein the fastener comprises a board portion arranged on the back surface of the heat sink and movably connected to the base, a connecting portion connected to the board portion and extending from the board portion to the transparent plate, and a compressing portion connected to the connecting portion, arranged on a side of the transparent plate away from the board portion and configured to buckle the transparent plate; when the buckle assembly is in the first state, the compressing portion of the fastener presses on the transparent plate to fix the transparent plate to the heat sink.

12. The LED lamp as claimed in claim 11, wherein the base comprises a first groove and at least one supporting rod connected to the first groove, the board portion arranged on the first groove and the at least one supporting rod; the board portion comprising at least one track hole, a screw passing through the at least one track hole and the at least one supporting rod so that the board portion is movably arranged on the first groove and the at least one supporting rod.

13. The LED lamp as claimed in claim 12, wherein the first groove is a U-shaped structure and comprises a bottom wall, and two sidewalls opposite to each other and respectively connected to the bottom wall; the buckle assembly further comprising an elastic member arranged inside the first groove, the fastener further comprising a third limiting portion connected to an end of the board portion away from the connecting portion, and extending into an end of the first groove away from the bottom wall, a first end of the elastic member abutted against the base, and a second end of the elastic member abutted against the third limiting portion.

14. The LED lamp as claimed in claim 13, wherein the base further comprises at least one first limiting portion arranged on an outer side of the first groove, and the fastener comprises a second limiting portion corresponding to the first limiting portion; wherein when the buckle assembly is in the first state, the compressing portion of the fastener presses on the transparent plate to fix the transparent plate to the heat sink; and when the buckle assembly is in the second state, the second limiting portion of the fastener abuts against the first limiting portion, and the compressing portion of the fastener releases the transparent plate.

15. The LED lamp as claimed in claim 14, wherein the fastener further comprises a pair of limiting grooves arranged between the second limiting portion and the third limiting portion, when the third limiting portion slides within the first groove, the two sidewalls are respectively received in the pair of limiting grooves to prevent the fastener from deviating directions during movement of the fastener.

16. The LED lamp as claimed in claim 15, wherein the heat sink comprises at least two openings formed at edges of the heat sink and passing through the heat sink, and an outer edge of the transparent plate is adjacent to an edge of each of the at least two openings; the connecting portion of the fastener arranged inside the at least two openings, and a second groove arranged at a position where the transparent plate aligns with the at least two openings; wherein when the buckle assembly is in the first state, the compressing portion of the fastener is pressed into the second groove; and when the buckle assembly is in the second state, the compressing portion of the fastener is detached from the second groove.

17. The LED lamp as claimed in claim 16, wherein the transparent plate defines a receiving room formed at a side facing the LED light board for receiving a sensor therein.

* * * * *